No. 627,113. Patented June 20, 1899.
J. GUEDEL.
SAW.
(Application filed Mar. 13, 1899.)
(No Model.)

Witnesses,
John B. Sherwood
L. A. Minturn

Inventor,
John Guedel,
By Joseph A. Minturn
Attorney.

THE NORRIS PETERS CO., PHOTO-LITHO., WASHINGTON, D. C.

UNITED STATES PATENT OFFICE.

JOHN GUEDEL, OF INDIANAPOLIS, INDIANA.

SAW.

SPECIFICATION forming part of Letters Patent No. 627,113, dated June 20, 1899.

Application filed March 13, 1899. Serial No. 708,911. (No model.)

*To all whom it may concern:*

Be it known that I, JOHN GUEDEL, a citizen of the United States, residing at Indianapolis, in the county of Marion and State of Indiana, have invented certain new and useful Improvements in Saws, of which the following is a specification.

The object of this invention is to provide a saw in which the major portion of the cutting and practically all of the removal of the fiber of the wood in the form of sawdust will be done by combined rake and cutting teeth which are not swaged and which are sharpened on the cutting side to make a center cut and to provide swaged cutting-teeth enough to widen the kerf to keep the saw from binding, but not to provide an excess of cutting-teeth to cut faster than the sawdust can be removed. I have found that the labor of sawing is very largely increased by the friction of the sawdust in the kerf; and the object of this invention is to provide ample facilities for its complete removal as fast as it is made.

The object also is to provide a saw which can be filed without a gage to determine the proportionate lengths of the teeth and which will saw without jumping should some of the teeth be made longer in filing than the others and to provide a saw which will cut through the grain of the wood crosswise, lengthwise, or angling, which will saw through knots where the grain is tangled, and can be used in hard or soft wood for ripping, cross-cutting, or mitering.

I accomplish the objects of the invention by the mechanism illustrated in the accompanying drawings, in which—

Figure 1:
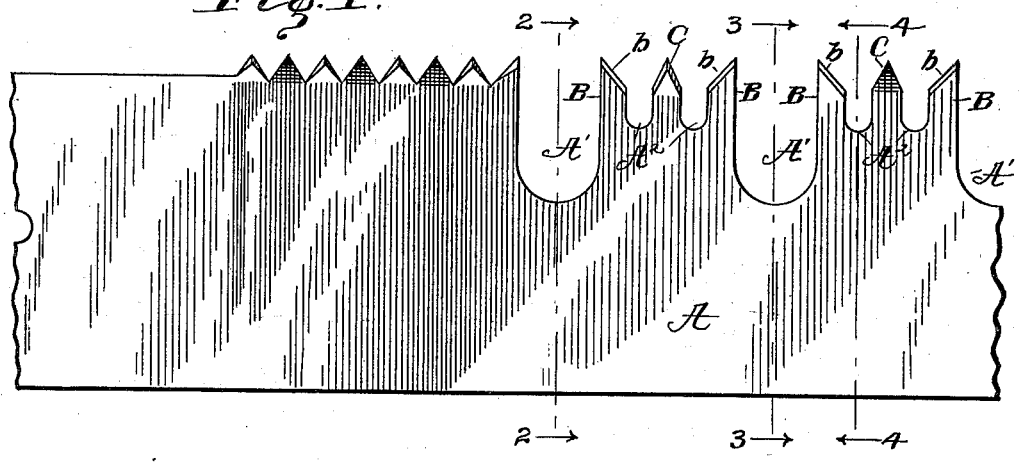
Figure 2:
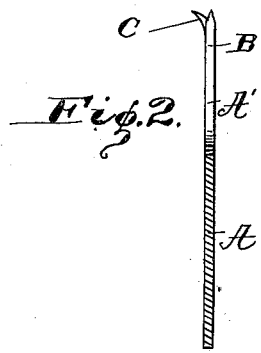
Figure 3:
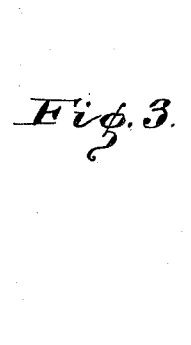
Figure 4:
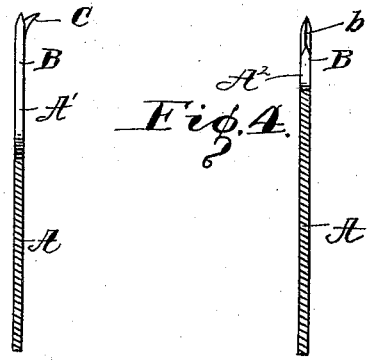

Figure 1 is a side elevation of a portion of a saw-blade provided with teeth embodying my invention; Fig. 2, a transverse section through the dotted line 2 2 of Fig. 1; and Figs. 3 and 4, like sections through the dotted lines 3 3 and 4 4, respectively, of Fig. 1.

Similar letters of reference indicate like parts throughout the several views of the drawings.

A represents the saw-blade, and A' are deep concave cuts or gullets, much wider than the width of the saw-teeth, to form repositories for the gathering and removal of the sawdust. On each side of the gullets are the combined rake and cutting teeth B, the edges of which on the sides next to the gullet are approximately straight and at right angles to the blade of the saw. These straight sides I call the "front" sides. The opposite or "rear" sides, as I call them, are inclined toward the straight ones and have both corners filed to a bevel to form a center cutting edge $b$ and which also gives the teeth a triangular point for each tooth. Between the inclined sides of each pair of rake-teeth thus formed is a triangular-shaped cutting-tooth C, which will preferably be separated at the base from the rake-teeth next to it by the small gullet $A^2$. These gullets are for "gumming" purposes—that is, for deepening and enlarging the interdental spaces between the rake-teeth and the cutting-teeth. The points of the rake and cutting teeth are in alinement with each other, which permits the filer to joint the saw down until his file touches every tooth, after which he can file the teeth up to a point.

A gage to get the rake-teeth lower than the cutting-teeth is not necessary, and should the filer get some of the rake-teeth longer than the others or some of the cutting-teeth shorter than the average the saw will not "jump" when used, because the rake-tooth going rearward will cut in the center of the kerf ahead of the rake-tooth going forward, which will keep the latter from wedging tight into the sawdust at the bottom of the kerf.

The rake-teeth are not swaged or set. A V-shaped groove is cut by the diagonal edges at the point by the tooth when going forward, or in the direction of its straight side, and a center cut is made by the opposite diagonal edge when the tooth is going in the opposite direction or rearward, and but for the narrow kerf made by the unswaged teeth B, which causes the blade to bind for lack of room, the saw would be most efficient without the teeth C. The teeth C are swaged, and each one has its edges sharpened on the side of the blade opposite that of the like tooth on each side of it, and the teeth are swaged toward their cutting edges—that is, every other one in an opposite direction—as is clearly shown in the sections of the blade, Figs. 2 and 3.

In practice the rear side $b$ of the teeth B cuts in the center of the kerf, which makes the sawdust only half as long as it would be without this center cut and of course easier to break out and remove. As the operation of sawing continues the saw sinks deeper into the wood, each tooth going a little lower down than the one preceding it, and the rake-tooth which is going forward—that is, in the direction of its straight side—and which does the clearing will go a little deeper than the rake-tooth preceding it, which by going rearward or in the direction of its center cutting edge, has done the center cutting. The rake-teeth by being beveled from each side of the saw-blade on the rear side of the teeth will form a cutting edge on the square side of the teeth as far down from the point as the bevel reaches, and will therefore run in the wood on a sliding cut and do part of the cutting, and, in fact, most of it, as the cutting-teeth are only for the purpose of widening the kerf, and the rake-teeth would do the work alone if there was room for the blade to pass through.

I am aware that saws have been made in which the teeth were formed in groups of four, comprising two outside rake-teeth having one side straight and approximately at right angles to the longitudinal dimensions of the saw-blade and having a second side inclined to the first and sharpened to a center cutting edge, said teeth not being swaged and said groups having two oppositely sharpened and set cutting-teeth placed intermediate of the rake-teeth. I am also aware that saw-teeth have been divided into groups of three, each group having a center cutting-tooth set in opposite directions in each alternate group, but not having rake-teeth, as herein described and shown, and such construction I do not claim broadly; but What I do claim as new, and wish to secure by Letters Patent of the United States, is—

1. In a saw, combined rake and cutting teeth which are not swaged having one straight, square, side approximately at right angles to the longitudinal dimensions of the saw-blade, and having a second side inclined to the first and sharpened to form a central cutting edge and triangular point, said combined rake and cutting teeth being grouped in pairs with their inclined sides toward each other, and triangular cutting-teeth swaged in alternate opposite directions, said swaged teeth being introduced in the groups between the combined rake and cutting teeth but the number of swaged cutting-teeth being less than the number of the combined rake and cutting teeth, substantially as shown and described.

2. A saw having the teeth assembled in groups which are separated by deep gullets, said groups except at the extreme end of the saw-blade, consisting of three teeth each of which are separated by narrower and shallower gullets, the outside teeth of said groups having straight square outer sides approximately at right angles to the longitudinal dimensions of the saw-blade and having inner inclined sides sharpened from both sides of the blade to form a cutting edge central of the tooth and a triangular point, said above-mentioned teeth not being swaged, and a triangular swaged cutting-tooth between the inclined sides of the two above-mentioned teeth with center cutting edges, the cutting-teeth in alternate groups of the saw being swaged in opposite directions, substantially as described and shown.

3. In a saw, a pair of combined rake and cutting teeth, each having one straight square side approximately at right angles to the longitudinal dimensions of the saw-blade and having a second side inclined to the first one, said inclined sides being sharpened from both sides of the saw-blade to form a triangular point and a cutting edge central of the tooth, said teeth not being swaged, and a single triangular, swaged, cutting-tooth between each pair of the first-described teeth forming a group of three teeth, the two outer teeth having their straight, square, sides outermost, substantially as described.

In witness whereof I have hereunto set my hand and seal, at Indianapolis, Indiana, this 4th day of March, A. D. 1899.

JOHN GUEDEL. [L. S.]

Witnesses:
H. A. MINTURN,
L. A. MINTURN.